US010384963B2

(12) United States Patent
Uby

(10) Patent No.: US 10,384,963 B2
(45) Date of Patent: Aug. 20, 2019

(54) METHOD FOR CONTROLLING A TREATMENT APPARATUS ARRANGEMENT, A TREATMENT APPARATUS ARRANGEMENT FOR A TREATMENT PLANT AS WELL AS A TREATMENT PLANT

(71) Applicant: XYLEM IP MANAGEMENT S.À.R.L., Senningerberg (LU)

(72) Inventor: Lars Uby, Spanga (SE)

(73) Assignee: XYLEM EUROPE GMBH, Luxembourg (LU)

(*) Notice: Subject to any disclaimer, the term of this patent is extended or adjusted under 35 U.S.C. 154(b) by 0 days.

(21) Appl. No.: 15/560,767

(22) PCT Filed: Mar. 21, 2016

(86) PCT No.: PCT/IB2016/051571
§ 371 (c)(1),
(2) Date: Sep. 22, 2017

(87) PCT Pub. No.: WO2016/151471
PCT Pub. Date: Sep. 29, 2016

(65) Prior Publication Data
US 2018/0057380 A1 Mar. 1, 2018

(30) Foreign Application Priority Data

Mar. 25, 2015 (SE) .................................... 1550356

(51) Int. Cl.
C02F 3/12 (2006.01)
C02F 3/00 (2006.01)
(Continued)

(52) U.S. Cl.
CPC .............. *C02F 3/1284* (2013.01); *B01F 7/06* (2013.01); *B01F 15/00253* (2013.01);
(Continued)

(58) Field of Classification Search
CPC ........ C02F 3/1284; C02F 3/006; C02F 3/282; C02F 3/2866; C02F 2203/006;
(Continued)

(56) References Cited

U.S. PATENT DOCUMENTS 5,490,934 A    2/1996  Schmid
8,110,106 B2 * 2/2012  Allen .................... C02F 3/286
                                                        210/259
(Continued)

FOREIGN PATENT DOCUMENTS

JP    63104699 A    5/1988
JP    2004283809 A  10/2004

OTHER PUBLICATIONS

International Search Report and Written Opinion for International Application PCT/IB2016/051571, dated Jun. 8, 2016—14 Pages.
International Preliminary Report on Patentability for International Application No. PCT/IB2016/051571, dated Jun. 8, 2016—15 Pages.

*Primary Examiner* — Fred Prince
(74) *Attorney, Agent, or Firm* — RatnerPrestia

(57) ABSTRACT

A method for controlling a treatment apparatus arrangement in a treatment plant, the treatment plant including a basin housing a liquid and solid matter. The operating condition in the basin is anoxic and/or anaerobic, and the treatment apparatus arrangement includes at least one mixer machine located in the basin and a variable speed drive operatively connected to the mixer machine. The variable speed drive operates the mixer machine alternately in a Normal Operation Mode, in which an operational speed of the mixer machine is at least the greater of a suspension speed and a process speed, and a Reduced Operation Mode, in which the operational speed of the mixer machine is below the suspension speed. Also described is a treatment apparatus arrangement and a treatment plant, respectively.

14 Claims, 2 Drawing Sheets

(51) Int. Cl.
*C02F 3/28* (2006.01)
*B01F 7/06* (2006.01)
*B01F 15/00* (2006.01)

(52) U.S. Cl.
CPC .. *B01F 15/00389* (2013.01); *B01F 15/00409* (2013.01); *C02F 3/006* (2013.01); *C02F 3/282* (2013.01); *C02F 3/2866* (2013.01); *B01F 2215/0052* (2013.01); *C02F 2203/006* (2013.01); *C02F 2209/40* (2013.01); *Y02W 10/15* (2015.05)

(58) Field of Classification Search
CPC ............ C02F 2209/40; B01F 15/00253; B01F 15/00409; B01F 15/00389; B01F 7/06; B01F 2215/0052; Y02W 10/15
USPC ........................................ 210/603, 605, 630
See application file for complete search history.

(56) References Cited

U.S. PATENT DOCUMENTS

| | | |
|---|---|---|
| 8,323,498 B2 | 12/2012 | Jenkins et al. |
| 2006/0096918 A1 | 5/2006 | Semmens |
| 2010/0032370 A1* | 2/2010 | Allen ...................... C02F 3/286 |
| | | 210/603 |
| 2010/0243558 A1 | 9/2010 | Ekster |
| 2013/0256225 A1 | 10/2013 | Leland |
| 2014/0138308 A1 | 5/2014 | Elger et al. |

\* cited by examiner

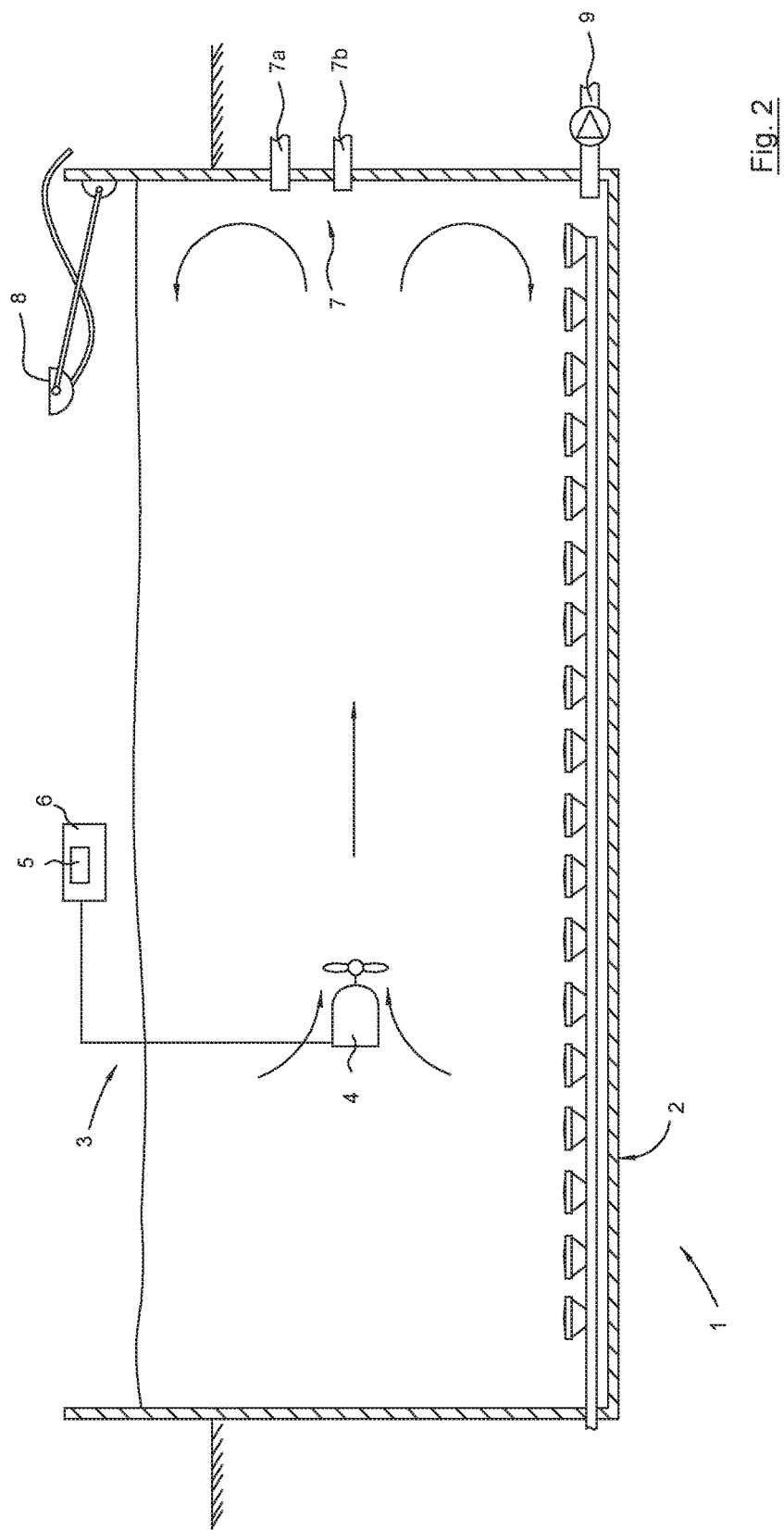

US 10,384,963 B2

METHOD FOR CONTROLLING A TREATMENT APPARATUS ARRANGEMENT, A TREATMENT APPARATUS ARRANGEMENT FOR A TREATMENT PLANT AS WELL AS A TREATMENT PLANT

CROSS REFERENCE TO RELATED APPLICATIONS

This application is a U.S. National Phase Patent Application of International Application No. PCT/IB2016/051571, filed Mar. 21, 2016, which claims priority to Swedish Application No. 1550356-8, filed Mar. 25, 2015, the contents of each of which are incorporated by reference in their entirety.

TECHNICAL FIELD OF THE INVENTION

The present invention relates generally to the field of methods and systems for controlling the treatment of liquid comprising solid matter. The present invention relates specifically to the field of methods and systems for controlling and performing waste water treatment.

The invention relates primarily to a method for controlling treatment apparatus arrangement in a treatment plant. The treatment plant is adapted to treat liquid comprising solid matter such as waste water, and comprises a basin housing said liquid comprising solid matter, the operating condition in said basin being anoxic and/or anaerobic, and said treatment apparatus arrangement that in its turn comprises at least one mixer machine located in said basin, the mixer machine having a treatment plant depending, predetermined suspension speed adapted to keep solid matter suspended in the liquid, and a variable speed drive operatively connected to said mixer machine.

The invention also relates to such a treatment apparatus arrangement and a treatment plant comprising such a treatment apparatus arrangement.

BACKGROUND OF THE INVENTION

Methods and systems for controlling the treatment of liquid comprising solid matter are known in the art.

Usually, a peak process load, i.e. peak hydraulic load and waste load, for a given treatment plant/basin will be determinative for the size of the mixer machine, which during operation is driven at full operational speed, i.e. directly connected to the power mains. Thereto, when the treatment plant is constructed/designed, the components such as the mixer machine are dimensioned for the peak process load that is expected for instance 10 or 15 years into the future. Thus, this way of designing a treatment plant and controlling the mixer machine in a treatment plant during anoxic and/or anaerobic conditions consumes an unreasonably large amount of energy.

A basin having anoxic and/or anaerobic conditions, may for instance be a Sequential Batch Reactor (SBR) during an anoxic and/or anaerobic process step, or be a separate basin designed for an anoxic and/or anaerobic process step in a line of basins which are designed for different process steps.

Some known systems having a mixer machine equipped with a synchronous motor also comprise a variable speed drive in order to be able to start the mixer machine by ramping up the speed from zero to full operational speed, since a synchronous motor due to its design cannot be directly started as full operational speed. The operational speed is then kept at full operational speed.

A development in the field of controlling treatment of liquid comprising solid matter is described in U.S. Pat. No. 8,323,498, that discloses a system for automatic control of a treatment process, i.e. aeration and mixing devices, based upon at least one dynamically measured parameter. According to U.S. Pat. No. 8,323,498 the system determines if the treatment process is aerobic or anoxic, respectively. When the treatment process is determined to be anoxic the aerators are turned off and the mixer machines are driven at the operational speed required by the real-time process load. Thus, U.S. Pat. No. 8,323,498 is entirely based on the idea that the mixer machines must be active, i.e. kept in one and the same operation mode, all the time during the entire anoxic process step in order to have a useful treatment. The mixer machine is driven at this process load dependent operational speed, also called the process speed, all the time during the anoxic process step until the treatment process once again is changed to aerobic. Thus, the process speed of U.S. Pat. No. 8,323,498 is an influent process load depending process speed, and especially dependent on the waste load/concentration in the influent wastewater, instead of using time dependent operation, in order to save wear and energy. During the entire anoxic treatment step, the process speed of the mixer machine must never go below the speed needed to keep the solid matters suspended.

Documents US 2010/243558 and US 2014/138308 are directed towards an alternative (non-combinable) treatment philosophy than the above mentioned U.S. Pat. No. 8,323,498. Instead of having the mixer machine active during the entire anoxic process step (as stipulated by U.S. Pat. No. 8,323,989), documents US 2010/243558 and US 2014/13808 disclose an alternative treatment philosophy using intermittent operation of the mixer machine between an active and an inactive operation mode, respectively, during the anoxic/anaerobic treatment step in order to save energy.

OBJECT OF THE INVENTION

The present invention aims at obviating the aforementioned disadvantages and failings of previously known methods and systems for controlling the treatment of liquid comprising solid matter, and at providing an improved method and system for controlling such treatment. A primary object of the present invention is to provide an improved method for controlling a treatment apparatus arrangement in a treatment plant and a treatment apparatus arrangement, of the initially defined type which consume less energy for mixing/treating the liquid during an anoxic and/or anaerobic process step without jeopardizing the process results.

It is another object of the present invention to provide a treatment apparatus arrangement, which has a longer product life in relation to the volume of treated liquid in relation to known treatment apparatus arrangements.

SUMMARY OF THE INVENTION

According to the invention at least the primary object is attained by means of the initially defined method and treatment apparatus arrangement having the features defined in the independent claims. Preferred embodiments of the present invention are further defined in the dependent claims.

According to a first aspect of the present invention, there is provided a method for controlling a treatment apparatus arrangement in a treatment plant, of the initially defined type, which method is characterized in that by means of the variable speed drive operating the mixer machine alternately in
- a Normal Operation Mode, in which an operational speed of the mixer machines is at least the highest of said suspension speed and a basin throughput rate depending process speed, said basin throughput rate being determined consecutively, and
- a Reduced Operation Mode, in which the operational speed of the mixer machine is below said suspension speed.

According to second aspect of the present invention, there is provided a treatment apparatus arrangement, as well as a treatment plant comprising such a treatment apparatus arrangement, arranged to be alternately operated in a Normal Operation Mode and a Reduced Operation Mode, respectively.

Thus, the present invention is based on the inventor's insight that a "basin content inertia" entail that the solid matter is kept in suspension in the liquid also some time after the mixer machine is turned off, and that accumulated solids are easily and instantly re-suspended when the mixer machine is reactivated. Thus, the invention is based on the conclusion to drive the mixer machine, during a process step that requires mixing, at an as low speed as possible during Normal Operation Mode and every now and then enter a Reduced Operation Mode, in which the operational speed of the mixer machine is reduced, and thereby saving energy consumed by the mixer machine without jeopardizing the process results. The present invention is also based on one inventor's insight that the process speed cannot only be dependent on the influent waste load.

In a preferred embodiment of the present invention, the operational speed of the mixer machine in the Reduced Operation Mode is below 10 GHz, and according to a yet more preferred embodiment the operational speed of the mixer machine is equal to zero.

According to a preferred embodiment, the mixer machine is operated in the Normal Operation Mode at least 5 minutes each turn, and thereto it is preferred that the mixer machine is operated in the Reduced Operation Mode at least 5 minutes each turn. Thereby about half the amount of the energy consumed by the mixer machine, during the anoxic and/or anaerobic process step, is saved.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein;

FIG. 2 is a schematic cross sectional side view of a Sequential Batch Reactor (SBR) basin comprising a mixer machine and aerators.

DETAILED DESCRIPTION OF PREFERRED EMBODIMENTS OF THE INVENTION

Figure 1:
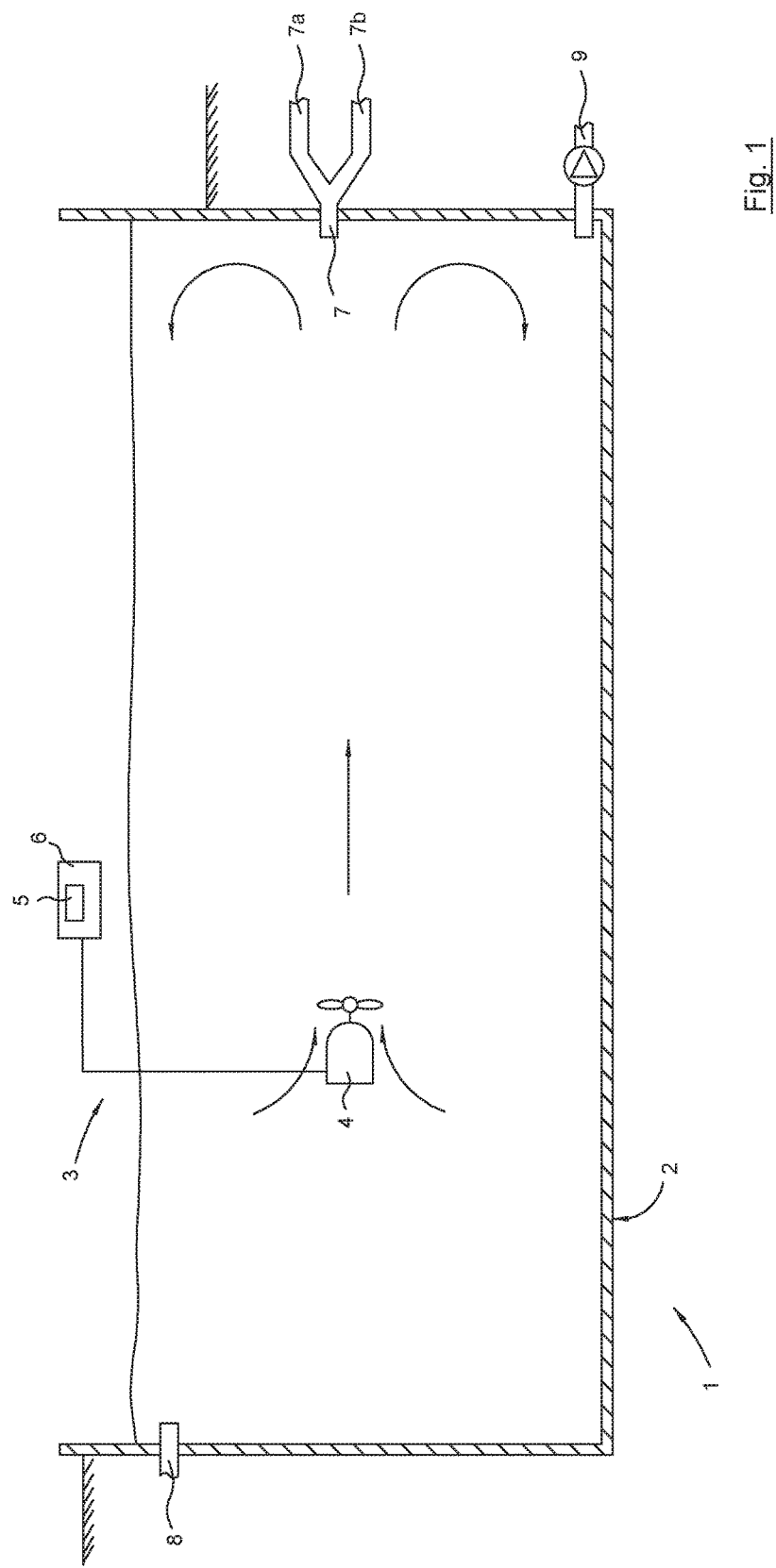
FIG. 1 is a schematic cross sectional side view of a basin comprising a mixer machine and no aerators.

The present invention will be described in connection with FIGS. 1 and 2, which only schematically disclose examples of a treatment plant, generally designated 1, suitable for treatment of liquid comprising solid matter. Liquid comprising solid matter is according to the present application typically constituted by waste water, sewage water, or the like.

The treatment plant 1 comprises a basin 2, arranged to house a basin content constituted by the liquid comprising solid matter, and a treatment apparatus arrangement, generally designated 3. It shall be realized that the treatment apparatus arrangement 3 can be sold separately and installed, in a pre-built customer owned basin, or sold together with the basin as a treatment plant to the costumer. Thus, a person/company providing an optimized inventive treatment apparatus arrangement 3 intended to be installed in a pre-built basin and intended to be controlled in accordance with the present invention, provides a truly essential and substantial part, of the treatment plant 1. Thus, such a treatment apparatus arrangement is optimized for a given basin and a given set of process parameters, and thereby such a treatment apparatus arrangement is an adapted solution that is not an off the shelf solution.

Said treatment apparatus arrangement 3 comprises at least one mixer machine 4, also known as a flow generating machine, and a variable speed drive 5, also known as a variable frequency drive. The at least one mixer machine 4 is arranged to be located in said basin 2, and the variable speed drive 5 is operatively connected to the mixer machine 4. The variable speed drive 5 may be located outside the basin 2 in connection to a control unit 6, as is shown in the figures, be submerged in the basin 2 or be built-in in the mixer machine 4. Said control unit 6 may also comprise an operator interface, such as a screen and key-pad.

The basin 2 comprises at least one inlet 7 for liquid to be treated and an outlet 8 for treated liquid, free from solid matter.

In FIG. 1 the basin 2 of the treatment plant 1 is a separate basin in a line of basins (not shown in full), each basin being arranged for a specific process step in the treatment of the liquid/waste water. In FIG. 2 the basin 2 of the treatment plant 1 is a Sequential Batch Reactor, SBR, in which different process steps of the treatment of the liquid being preformed after each other in one and the same basin 2. It is essential that the operating condition in said basin 2 shall be anoxic and/or anaerobic, i.e. there shall be no, substantially no or as little air/oxygen added to the basin 2 as to maintain a zero or near-zero level of dissolved oxygen concentration during the realization of the claimed method.

In the embodiment according to FIG. 1 there is usually a continuous basin input via said inlet 7 and a continuous basin output via said outlet 8, respectively. Thus, a bigger basin input entails an increased basin throughput rate. In the embodiment according to FIG. 1 there can be a batchwise basin input via said inlet 7 or a continuous basin input, at the same time as the basin output is batchwise via said outlet 8. The outlet 8 in the embodiment according to FIG. 2 is a so-called decanter that will be lowered into the liquid.

The basin input is at least constituted by a basin inflow, i.e. inflow of liquid to the basin 2 from a preceding/upstream process basin within the treatment plant 1 or from an external/upstream pump station, or the like. Thus, the liquid in the basin inflow comprises large amounts of solid matter, organic substances, nutrients, etc. Said basin input may also be constituted by a recirculation flow, i.e. liquid that is recirculated from downstream the basin 1. According to one embodiment the basin inflow enter the basin 2 via a sub-inlet designated 7a and the recirculation flow enter the basin 2 via another sub-inlet designated 7b. The recirculation flow may be less than, equal to, or bigger than the basin inflow. It shall be realized that the basin inflow and the recirculation flow can be premixed and enter the basin 2 in a common inlet 7 as shown in FIG. 1, or enter the basin 2 separately as shown in FIG. 2.

According to the disclosed embodiments the basin 2 also comprises a sludge outlet 9, intended for removal of settled solid matter.

During operation the treatment plant/basin is subject to a Process Load. The Process Load is constituted by a Hydraulic Load and a Waste Load, wherein the Hydraulic Load is constituted by the basin input, and wherein the Waste Load is constituted by the concentration of solid matter, organic substances, nutrients, etc. in the basin input. The Process Load usually fluctuates according to a known/predictable pattern that is slowly changing over the day (24 hours). Usually the Process Load, has one peak in the morning and one peak in the afternoon/early evening.

The mixer machine 4 is arranged to be driven at a variable operational speed by the variable speed drive 5, i.e. the mixer machine 4 is arranged to provide a variable level of thrust to the liquid, mainly in order to meet up with the changing Process Load. Thus, the operational speed or the mixer machine is in rough outlines dependent on providing adequate mixing of the liquid/solid matter during changing process conditions, wherein the size of the basin input and the operational speed of the mixer machine 4 has a direct correlation and thereto, if the basin input is low or zero, the solid matter shall nevertheless be kept suspended.

The basic idea is to drive the mixer machine 4 at an as low operational speed as possible without adversely affecting the process/treatment result. The level of thrust from the mixer machine 4 and the operational speed of the mixer machine 4 correlate with each other, and shall be regarded as equivalent expressions herein.

The level of thrust needed for different Process Load situations and different predetermined process criteria, is given and available for the specific treatment plant/basin, and thus the operational speed of the mixer machine 4 is predetermined for each combination of different Process Load situations and different predetermined process criteria.

The operational speed of the mixer machine 4 is divided into a process speed and a suspension speed, respectively. The process speed is basin throughput rate depending and the suspension speed is treatment plant depending, the process speed might be elevated in relation to the suspension speed, or the suspension speed might be elevated in relation to the process speed.

The suspension speed is the minimum operational speed of the mixer machine 4 at which the solid matter is kept suspended in the liquid, i.e. at which operational speed a so-called suspension criterion is met. The suspension speed is depending on the shape, size and overall configuration of the basin 2. Thus, the suspension speed is given and available for each treatment plant/basin. The expression "given and available" means that a process engineer will easily determine the suspension speed knowing the design/configuration of the treatment plant/basin, for instance by means of known computer programs. Thus, the mixer machine 4 has a treatment plant depending predetermined suspension speed.

The process speed is the operational speed of the mixer machine 4 at which the sought process result is reached, and the process speed is at least depending on the basin throughput rate. The basin throughput rate embrace/is based on at least the basin input, adequate blending of the basin input and a basin content, and the basin output.

The basin throughput rate is according to a preferred embodiment directly proportional to the size of the basin input (basin inflow plus recirculation flow), and the relationship between basin input and basin output, which also have a direct effect on the need for blending. Said basin throughput rate is determined consecutively, preferably continuously. The basin input is preferably measured upstream the basin 2, and a bigger basin input entails an increased basing throughput rate and thereby the liquid must be treated more quickly, the process speed being increased in order to increase the mixing level. The process speed is also dimensioned to avoid so-called "bypassing" by providing blending to cause homogenization of the basin content with the basin inflow and with the recirculation flow. "Bypassing" is direct throughput currents extending the shortest/fastest way from the inlet to the outlet without being mixed with the basin content, thus, the retention time needs to be long enough to enable treatment of the liquid to the extent required and specified in the design of one treatment process. The basin output is preferably measured downstream the basin 2. The basin input is equivalent to influent rate, and basin output is equivalent to effluent rate.

For instance, a lower Hydraulic Load (basin input) entail that a lower process speed can be used to prevent "bypassing" and to provide homogenization by means of blending. A lower Waste Load (concentration of solid matter, organic substances, nutrients, etc.) entails a need for a less intense process, i.e. less mixing/contact between bacteria and the solid matter and less need for blending.

The operational speed/thrust of the mixer machine 4 is preferably controlled in real-time by changing the frequency of the mixer machine 4 by means of the variable speed drive 5, and thereby the operational speed/thrust of the mixer machine 4 is changed.

According to the invention the mixer machine 4 is alternately operated, by means or the variable speed drive 5, in a Normal Operation Mode and a Reduced Operation Mode, respectively.

In the Normal Operation Mode the operational speed of the mixer machine 4 is the highest of the suspension speed and the process speed, and in the Reduced Operation Mode, the operational speed of the mixer machine 4 is below said suspension speed. Even if the operational speed of the mixer machine 4 is below the suspension speed in the Reduced Operation Mode, a basin content inertia entail that the solid matter is suspended in the liquid also some time after the mixer machine 4 is turned off, and thereto the solid matter that will settle/accumulate at the bottom of the basin 2 is easily re-suspended when the mixer machine is re-activated in. the subsequent Normal Operation Mode. Thus, the energy consumed by the mixer machine 4 in order to mix the basin content is decreased without jeopardizing the process/treatment result. The operational speed in the Normal Operation Mode is consecutively controlled to match the changing process conditions.

According to a preferred embodiment the operational speed or the mixer machine 4 in the Reduced Operation Mode is below 10 Hz, most preferably the operational speed of the mixer machine 4 is equal to zero in the Reduced Operation Mode. It shall be pointed out that the operational speed of the mixer machine 4 in the Reduced Operation Mode may be different for every period, and/or may be changed during one and the same period, and/or be the same each period, or a combination thereof. The operational speed of the mixer machine 4 in the Reduced Operation Mode may be dependent on the operational speed of the mixer machine in the preceding Normal Operation Mode, i.e. a high operational speed in the Normal Operation Mode may resort in a high operational speed in the subsequent Reduced Operation Mode, and a low operational speed in the Normal Operation Mode may result in a low operational speed in the subsequent Reduced Operation Mode, respectively.

According to a preferred embodiment the mixer machine 4 is operated in the Normal Operation Mode at least 5 minutes each turn, preferably at least 10 minutes, preferably depending on the present process condition. Thereto, it is preferred that the mixer machine 4 is operated in the Reduced Operation Mode at least 5 minutes each turn, preferably at least 10 minutes, most preferably at least 15 minutes, preferably depending on the present process condition. It shall be pointed out that a present Reduced Operation Mode may be terminated in advance due to rapidly changing process condition, either manually and/or automatically. It shall be pointed out that a default schedule can be determined for the specific treatment plant/basin by an operator or a specialist, which default scheme can be deviated from if the process conditions/process lead deviates from a normal distribution over 24 hours. During the night and other time periods having a small process load, each Reduced Operation Mode can preferably be more than 30 minutes and each Normal Operation Mode can preferably be less than 10 minutes.

The treatment apparatus arrangement 3 may comprise at least two mixer machines. In one embodiment the at least two mixer machines are operated mutually independent of each other, i.e. they serve for instance different areas of the basin 2. In another embodiment the at least two mixer machines are operated alternately.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equipment may be modified in all kinds of ways within the scope of the appended claims.

It shall be pointed out that the term operational speed of the mixer machine is used as a direct equivalent to operational frequency, and the values of the operational speed of the mixer machine is given in Hertz.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even though it is not explicitly stated that features from a specific embodiment may be combined with features from another embodiment, the combination shall be considered obvious, if the combination, is possible.

The invention claimed is:

1. A method for controlling a treatment apparatus arrangement in a treatment plant for treating a liquid comprising solid matter, the treatment plant having a basin housing a basin content including the liquid comprising the solid matter, said basin having an anoxic or anaerobic operating condition, the treatment apparatus arrangement including at least one mixer machine located in said basin, the mixer machine having a treatment-plant-dependant predetermined suspension speed adapted to keep solid matter suspended in the liquid, and a variable-speed drive operatively connected to said mixer machine, wherein the method comprises the step of alternately operating the mixer machine by the variable-speed drive in a Normal Operating Mode and a Reduced Operating Mode, wherein, in the Normal Operating Mode, an operational speed of the mixer machine is controlled in real-time to be the greater of said suspension speed and a basin-throughput-rate-dependant process speed, said basin-throughput-rate determined continuously and based on at least a basin input and a basin output, said process speed predetermined for each combination of different process load situations and different process criteria in the basin to be a minimum, wherein the process load comprises a hydraulic load and a waste load, and wherein, in the Reduced Operation Mode, the operational speed of the mixer machine is below said suspension speed.

2. The method according to claim 1, wherein the process speed minimum is predetermined to avoid adversely affecting treatment results while still providing adequate mixing of the liquid comprising the solid matter.

3. The method according to claim 2, wherein the process speed minimum is predetermined to facilitate re-suspension of the solid matter in the liquid upon resuming the operational speed of the mixer in the Normal Operating mode.

4. The method according to claim 1, wherein the operational speed of the mixer machine in the Reduced Operation Mode is below 10 Hz.

5. The method according to claim 1, wherein the process speed of the mixer machine is proportional to the basin input.

6. The method according to claim 1, wherein the mixer machine is operated in the Normal Operation Mode at least 5 minutes each turn.

7. The method according to claim 1, wherein the mixer machine is operated in the Reduced Operation Mode at least 5 minutes each turn.

8. The method according to claim 1, wherein the treatment apparatus arrangement comprises at least two mixer machines, which are operated mutually independently of each other.

9. The method according to claim 1, wherein the basin comprises at least one inlet and at least one outlet for liquid.

10. The method according to claim 9, wherein the basin input via said at least one inlet and the basin output via said at least one outlet, respectively, are continuous.

11. A treatment apparatus arrangement for a treatment plant that is adapted to treat a liquid comprising solid matter in an operating condition that is anoxic or anaerobic, the treatment apparatus arrangement comprising:

at least one mixer machine configured to be located in a basin that houses a basin content including the liquid to be treated, the mixer machine configured to be driven in a treatment-plant-dependant predetermined suspension speed adapted to keep the solid matter suspended in said liquid, and a variable speed drive operatively connected to said mixer machine, wherein the variable speed drive is configured to operate the mixer machine alternately in:

(i) a Normal Operation Mode, in which the operational speed of the mixer machine is controlled in real-time to be the greater of said suspension speed and a basin-throughput-rate-dependant process speed, and (ii) a Reduced Operation Mode, in which the operational speed of the mixer machine is below said suspension speed, the treatment apparatus arrangement further comprising means for continuous determination of said basin-throughput-rate, which is based on at least a basin input and a basin output, wherein said process speed is predetermined for each combination of different process load situations and different process criteria in the basin to be a minimum, and wherein the process load comprises a hydraulic load and a waste load.

12. A treatment plant for treatment of waste water liquid comprising solid matter comprising the treatment apparatus arrangement according to claim 11, the treatment plant further comprising the basin arranged to house the basin contents including the liquid comprising the solid matter.

13. The treatment apparatus arrangement according to claim 11, wherein the process speed minimum is predetermined to avoid adversely affecting treatment results while still providing adequate mixing of the liquid comprising the solid matter.

14. The treatment apparatus arrangement according to claim 11, wherein the process speed minimum is predetermined to facilitate re-suspension of the solid matter in the liquid upon resuming the operational speed of the mixer machine in the Normal Operating mode.

* * * * *

UNITED STATES PATENT AND TRADEMARK OFFICE
CERTIFICATE OF CORRECTION

PATENT NO. : 10,384,963 B2
APPLICATION NO. : 15/560767
DATED : August 20, 2019
INVENTOR(S) : Lars Uby Page 1 of 1

It is certified that error appears in the above-identified patent and that said Letters Patent is hereby corrected as shown below:

On the Title Page

Item (73), should read:
(73) Assignee: Xylem Europe GMBH, Switzerland (CH)

Signed and Sealed this
Eleventh Day of August, 2020

Andrei Iancu
*Director of the United States Patent and Trademark Office*